US006512069B1

(12) United States Patent
Ohrbom et al.

(10) Patent No.: US 6,512,069 B1
(45) Date of Patent: Jan. 28, 2003

(54) DURABLE REFINISH COATING

(75) Inventors: Walter H. Ohrbom, Hartland Township, MI (US); John C. Goan, Toledo, OH (US); Lawrence E. Thieben, Waterville, OH (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/740,656

(22) Filed: Dec. 19, 2000

Related U.S. Application Data

(63) Continuation-in-part of application No. 09/677,063, filed on Sep. 29, 2000.
(60) Provisional application No. 60/157,166, filed on Sep. 30, 1999.

(51) Int. Cl.[7] .............................................. C08F 126/02
(52) U.S. Cl. ...................... 526/301; 526/270; 526/304; 526/307.4; 526/320; 525/518; 525/519
(58) Field of Search ................................ 526/270, 301, 526/304, 307.4, 320; 525/518, 519

(56) References Cited

U.S. PATENT DOCUMENTS

| 4,546,046 A | 10/1985 | Etzell et al. ................. 428/460 |
| 4,847,329 A | 7/1989 | Koleske et al. .............. 525/162 |
| 5,342,891 A | 8/1994 | Koleske et al. .............. 525/162 |
| 5,412,049 A | 5/1995 | Argyropoulos et al. ...... 526/312 |
| 5,760,127 A | 6/1998 | Bammel et al. ............. 524/598 |
| 6,106,951 A | 8/2000 | Ohrbom et al. ........... 428/423.1 |

FOREIGN PATENT DOCUMENTS

| EP | 0 767 227 A1 | 4/1997 | ......... C09D/210/00 |
| WO | WO 00/31195 | 6/2000 | ......... C09D/133/06 |
| WO | WO 01/23484 | 4/2001 | ......... C09D/201/00 |

OTHER PUBLICATIONS

English Language Translation of PCT/US 01/44564 International filed date Nov. 28, 2001.

Primary Examiner—Helen L. Pezzuto
(74) Attorney, Agent, or Firm—Anna M. Budde

(57) ABSTRACT

Disclosed is a carbamate-functional acrylic polymer having an epsilon-caprolactone moiety beta to a carbamate group and a coating composition containing the acrylic polymer of the invention. The coating composition is particularly useful as a refinish coating and in refinish coating methods.

15 Claims, No Drawings

DURABLE REFINISH COATING

RELATED APPLICATION

This application is a continuation-in-part of U.S. Ser. No. 09/677,063, having a filing date of Sep. 29, 2000, which claims priority to Provisional Application No. 60/157,166, filed Sep. 30, 1999.

FIELD OF THE INVENTION

The present invention relates generally to coating compositions, particularly clearcoat compositions, especially clearcoat compositions for refinish coatings.

BACKGROUND OF THE INVENTION

The automotive industry has made extensive use of basecoat-clearcoat composite coatings for automotive body panels and components because such composites offer exceptional gloss, depth of color, distinctness of image, or special metallic effects. Refinish coatings, likewise, have moved toward two-layer basecoat-clearcoat systems for repairing original equipment coatings so that the refinish coating will have approximately the same appearance as the original coating.

Single-layer topcoats and the clearcoats of color-plus-clear composite coatings require an extremely high degree of clarity and gloss to achieve the desired visual effect. Such coatings require a low degree of visual aberrations at the surface of the coating in order to achieve the desired high gloss and high distinctness of image (DOI). Because defects are so noticeable in the smooth, glassy surfaces required for these coatings, they are especially susceptible to a phenomenon known as environmental etch. "Environmental etch" is a term applied to a kind of exposure degradation that is characterized by spots or marks on or in the finish of the coating that often cannot be rubbed out. It has been difficult to predict the degree of resistance to environmental etch that a high gloss topcoat or color-plus-clear composite coating will exhibit.

Traditional high solids enamels, in which a hydroxyl-functional acrylic polymer is crosslinked with an aminoplast resin, do not provide the desired level of resistance to environmental etch. While the ether linkages formed by aminoplast resin crosslinkers, for example a melamine-formaldehyde resin crosslinked with a hydroxyl-functional resin, are undesirable from the standpoint of resistance to environmental etch, aminoplast crosslinkers are desirable for other reasons, such as providing high solids coatings having excellent appearance that cure under moderate conditions.

Coating compositions containing carbamate-functional polymers and aminoplast resin curing agents have improved resistance to environmental etch. The improved resistance to environmental etch has increased the use of carbamate-functional polymers with aminoplast resins in original finish coating compositions. Coating compositions with carbamate-functional polymers, however, typically have an increase in regulated volatile organic compound emissions compared to the traditional high-solids enamels. Thus, it would be desirable to reduce the regulated volatile organic compound emissions in the coating compositions containing carbamate-functional polymers. This need to reduce regulated emissions is particularly acute for refinish coatings, which are applied by small businesses that cannot afford the elaborate and expensive high efficiency abatement equipment of the original equipment manufacturers.

Etzell, U.S. Pat. No. 4,546,046, incorporated herein by reference, describes epsilon-caprolactone modified acrylic polymers in coating compositions for increased flexibility so that the coating can be applied to flexible as well as rigid substrates. The epsilon-caprolactone-modified acrylic also provided higher solids compositions. The epsilon-caprolactone extended acrylic polymer described in the Etzell patent does not provide sufficient resistance to environmental etch, however, because the curing mechanism is again the reaction between an aminoplast crosslinker and hydroxyl functionality, including the terminal hydroxyl of the caprolactone extension, of the acrylic polymer.

Argypolous, U.S. Pat. No. 5,412,049, incorporated herein by reference, describes (meth)acrylate copolymers obtained by copolymerization of one or more hydroxyl-functional (meth)acrylate esters and one or more (meth)acrylate esters of hydroxyalkyl carbamates. The latter monomer may be prepared by different means to provide the ester structure, including direct esterification of (meth)acrylic acid with the hydroxyalkyl carbamate compound. The hydroxyl-functional monomer can be the product of reacting epsilon-caprolactone with a hydroxyalkyl acrylate. The copolymers are then crosslinked with a crosslinking agent reactive with the hydroxyl groups or the carbamate groups to provide a cured coating composition. The Argypolous reference does not mention preparation of a polymer having a hydroxyl group beta to a carbamate group.

Ohrbom, U.S. Pat. No. 6,106,951, incorporated herein by reference, describes a coating composition containing a carbamate-functional resin, including a beta-hydroxy carbamate-functional resin, in which non-carbamate groups that are reactive with an aminoplast crosslinker, particularly hydroxyl groups, are converted to non-reactive moieties to prevent formation of ether linkages when the acrylic is cured with the aminoplast crosslinker. Because the hydroxyl groups no longer can react with the aminoplast crosslinker to form the relatively weak ether linkages, the resistance of the cured coating to environmental etch is increased. The Ohrbom reference does not describe a modification to reduce the viscosity of the resin.

It would be desirable to produce a lower viscosity, beta-hydroxy carbamate-functional copolymer without increasing the hydroxyl groups by adding modified hydroxyl monomers that produce undesirable ether linkages during crosslinking, while maintaining the higher resistance to environmental etch of carbamate-functional resins.

SUMMARY OF THE INVENTION

The present invention provides a coating composition comprising a carbamate-functional acrylic polymer having a monomer unit with an epsilon-caprolactone moiety beta to a carbamate group. In one aspect of the invention, the monomeric unit including the epsilon caprolactone moiety and carbamate group includes the following structure:

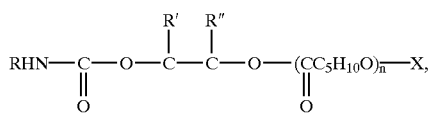

in which R is hydrogen or alkyl, preferably alkyl of from 1 to about 8 carbons, more preferably alkyl of from 1 to about 4 carbons; n is, on average, from about 0.5 up to about 10, preferably from about 0.5 to about 6, more preferably from about 1 to about 4, and still more preferably from about 1 to about 3; X is hydroxyl, or, preferably, does not have functionality that reacts with the crosslinker when the coating composition is cured; one of R' and R" is H or alkyl of up to 4 carbon atoms, preferably H, and the other of R' and R" represents a divalent radical connecting the structure to the remainder of the monomeric unit.

While not wishing to be bound by theory, it is believed that the epsilon caprolactone moiety of the present invention is particularly effective in reducing the viscosity of the polymer because of its proximity to the carbamate group, being beta to the carbamate group.

In one embodiment of the invention, the epsilon-caprolactone moiety, which is formed with a terminal hydroxyl group, is further reacted to convert the hydroxyl group into a group that is not reactive with the crosslinker, particularly not reactive with an aminoplast crosslinker, under the crosslinking conditions. Even though the epsilon moiety may not then participate in the crosslinking reaction, the benefit of reduced viscosity is retained, while at the same time no weak ether linkages are formed by reaction of a hydroxyl group with the aminoplast crosslinker. In particular, X in the structure above may have no active hydrogens.

The polymer of the present invention having an epsilon-caprolactone moiety and a carbamate group on the same monomeric unit may be produced in two different ways. The first method of producing the polymer of the present invention includes a step of reacting a carbamate-functional polymer having beta-hydroxyl groups with epsilon-caprolactone to produce an epsilon-caprolactone moiety beta to the carbamate group on the same monomeric unit. The second method of producing the polymer having an epsilon caprolactone moiety beta to a carbamate group includes steps of reacting a beta-hydroxy carbamate monomer with epsilon-caprolactone to produce a monomer with a caprolactone moiety beta to a carbamate group and then polymerizing the monomer having epsilon-caprolactone moiety beta to the carbamate group to produce the polymer of the invention.

The present invention further provides a coating composition containing the polymer having an epsilon-caprolactone moiety beta to carbamate group and an article having a substrate upon which there is a cured coating derived from the coating composition according to the invention.

DETAILED DESCRIPTION OF THE INVENTION

The coating composition of the invention includes a carbamate-functional acrylic polymer having at least one epsilon-caprolactone moiety beta to a carbamate group. The term "carbamate group" as used in connection with the present invention refers to a group having a structure:

$$-O-\overset{O}{\underset{\|}{C}}-NHR,$$

in which R is H or alkyl, preferably R is H or alkyl of from 1 to about 8 carbon atoms, more preferably R is H or alkyl of from 1 to about 4 carbon atoms, and yet more preferably R is H. When R is H, the carbamate group is referred to herein as a primary carbamate group.

The term "epsilon-caprolactone moiety" as used in connection with the present invention refers to a group including an n-hexanoate ester structure:

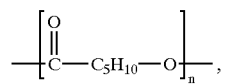

in which n is, on average for all of the hydroxyl groups and carbamate moieties of the polymer, from about 0.5 to about 10, preferably from about 0.5 to about 6, more preferably from about 1 to about 4, and still more preferably from about 1 to about 3. The value of n may be controlled by the ratio of the moles of epsilon-caprolactone reacted with the equivalents of hydroxyl groups of the beta-hydroxy carbamate-functional monomer or copolymer. A fractional value for n is obtained when less than one mole of epsilon-caprolactone is reacted per hydroxyl equivalent of the acrylic resin, so that some of the hydroxyl groups beta to the carbamate group are not esterified.

The acrylic polymer having at least one epsilon-caprolactone moiety in the beta position relative to a carbamate group can be prepared in at least two different ways. The first method of preparing the polymer is by reacting an acrylic polymer having beta-hydroxy carbamate groups with epsilon-caprolactone. A second method of preparing the polymer is by addition polymerizing a monomer having the epsilon-caprolactone moiety beta to a carbamate group.

According to the first method, an acrylic polymer having beta-hydroxyl carbamate groups is reacted with epsilon-caprolactone. The acrylic polymer having beta-hydroxy carbamate groups may, in turn, be formed in at least two ways. In a first way, an acrylic polymer without carbamate functionality has at least one other reactive functionality that is converted to a beta-hydroxy carbamate group. In a second way, an ethylenically unsaturated beta-hydroxy carbamate monomer is polymerized to form the acrylic polymer having beta-hydroxy carbamate groups.

In the first way of forming the acrylic polymer with beta-hydroxy carbamate groups, the acrylic polymer is formed by polymerizing at least one monomer having a functionality that can be converted, either during or after polymerization, to beta-hydroxy carbamate functionality. One example of a functionality that can be reacted to provide the carbamate group is hydroxyl functionality. An hydroxyl-functional acrylic resin may be conveniently formed by using an hydroxyl-functional ethylenically unsaturated monomer in the polymerization of the acrylic resin. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms. The hydroxy-functional acrylic polymer may then be reacted with an alkyl beta-hydroxy carbamate compound to produce a beta-hydroxy carbamate-functional acrylic polymer. Illustrative examples of useful alkyl beta-hydroxy carbamate compounds include, without limitation, 2-hydroxypropyl carbamate, 2-hydroxyethyl carbamate, 2-hydroxybutyl carbamate, N-methyl-2-hydroxyethyl carbamate, N-ethyl-2-hydroxyethyl carbamate, N-propyl-2-hydroxyethyl carbamate, N-butyl-2-hydroxyethyl carbamate, N-methyl-2-hydroxypropyl carbamate, N-ethyl-2-hydroxypropyl carbamate, N-propyl-2-hydroxypropyl carbamate, N-butyl-2-hydroxypropyl carbamate, and so on. The reaction may be carried out using a catalyst such as, for example, organometallic complexes, including tin compounds such as dibutyltin oxide, dibutyltin dilaurate, dibutyltin diacetate, dibutyltin dimethoxide; aluminum compounds such as aluminum isopropoxide; zinc compounds, titanates, and strong acid catalysts. The amount of such esterification catalyst can range from about 0.05 percent to about 5 percent by weight of the reactants. Typically, the catalyst will be from about 0.1 to about 1% by weight of the reactants.

Additional groups that can be converted to a beta-hydroxy carbamate group include cyclic carbonate groups, epoxide groups, and unsaturated bonds. Cyclic carbonate groups can be converted to carbamate groups by reaction with ammonia or a primary amine, which ring-opens the cyclic carbonate to form a β-hydroxy carbamate. Epoxide groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to a carbamate group by first reacting with peroxide to convert to an epoxy group, then with $CO_2$ to form a cyclic carbonate, and then with ammonia or a primary amine to form the carbamate.

When the polymer is prepared with a group that is to be converted to a beta-hydroxy carbamate group, monomers having functionality reactive with the group that is to be converted to carbamate are avoided during polymerization of the acrylic polymer. For example, when the convertible group is an epoxy group, acid-functional monomers are not included. When the monomer has a group convertible to a beta-hydroxy carbamate group, the conversion to a beta-hydroxy carbamate group may be carried out either during the polymerization and/or after the polymerization reaction.

In the second way for forming the acrylic polymer with beta-hydroxy carbamate groups, the acrylic polymer is formed by polymerizing a monomer having beta-hydroxy carbamate functionality. The β-hydroxy carbamate monomer has an ethylenically unsaturated group and a β-hydroxy carbamate group.

One way of preparing the β-hydroxy carbamate monomer of the invention is by reacting an epoxide group-containing polymerizable monomer first with carbon dioxide to convert the oxirane group to a cyclic carbonate group, and then with ammonia or a primary amine to convert the cyclic carbonate group to a β-hydroxy carbamate group. Examples of suitable epoxide group-containing polymerizable monomers include, without limitation, glycidyl acrylate, glycidyl methacrylate, glycidyl crotonate, and allyl glycidyl ether. Epoxide groups can be converted to carbamate groups according to the method described above. The beta-hydroxy carbamate monomer can also be prepared from polymerizable monomers having carbonate groups in the manner described above for preparing a carbamate group from a carbonate group. The beta-hydroxy carbamate monomer can also be prepared by reacting an hydroxy-functional addition polymerizable monomer with an alkyl beta-hydroxy carbamate compound. Examples of hydroxy-functional addition polymerizable monomers and alkyl beta-hydroxy carbamate compounds have already been mentioned. The reaction may be carried out using a catalyst such as, for example, organometallic complexes, including tin compounds such as dibutyltin oxide, dibutyltin dilaurate, dibutyltin diacetate, dibutyltin dimethoxide; aluminum compounds such as aluminum isopropoxide; zinc compounds, titanates, and strong acid catalysts. The amount of such esterification catalyst can range from about 0.05 percent to about 5 percent by weight of the reactants. Typically, the catalyst will be from about 0.1 to about 1% by weight of the reactants.

After the beta-hydroxy carbamate monomer is prepared, it is then polymerized, preferably along with one or more different ethylenically unsaturated monomers, to form the beta-hydroxy carbamate-functional polymer.

The beta-hydroxy carbamate-functional polymer is reacted with epsilon-caprolactone to introduce an epsilon-caprolactone moiety beta to the carbamate group. On average, at least half of the beta-hydroxy groups are reacted with the epsilon-caprolactone, and preferably all of the beta-hydroxy groups are reacted with the epsilon-caprolactone. On average, up to about 10 may be reacted for each hydroxyl equivalent of the polymer, and preferably up to about 6, more preferably up to about 4, and still more preferably up to about 3 epsilon-caprolactone molecules are reacted per hydroxyl equivalent. The reaction of the beta-hydroxy groups with the epsilon-caprolactone may be carried out under conditions typical for esterification of hydroxyl groups with epsilon caprolactone, such as at temperatures of from about 100° C. to about 200° C. with a suitable catalyst. Examples of useful catalysts include, without limitation, alkali or alkaline earth metal alkoxides, e.g. sodium or calcium methoxide; aluminum isopropoxide, tetraalkyl titanates, titanium chelates and acylates, lead salts and lead oxides, zinc borate, antimony oxide, stannous octoate, organic acids, inorganic acids such as sulfuric, hydrochloric, and phosphoric acids, and Lewis acids such as boron trifluoride.

Alternatively, the acrylic polymer having at least one epsilon-caprolactone moiety in the beta position relative to a carbamate group may be prepared by polymerizing a monomer that already has an epsilon-caprolactone moiety beta to a carbamate group.

The monomer having a beta-hydroxy carbamate functionality may be prepared in one of the methods previously stated. Following the production of the beta-hydroxy carbamate functional monomer, epsilon-caprolactone is reacted with the monomer. The epsilon-caprolactone reacts with the hydroxyl group in the beta position to provide an epsilon-caprolactone moiety beta to the carbamate group of the monomer. A suitable catalyst for the esterification reaction may be used to promote the reaction. Examples of useful catalysts include, without limitation, alkali or alkaline earth metal alkoxides, e.g. sodium or calcium methoxide; aluminum isopropoxide, tetraalkyl titanates, titanium chelates and acylates, lead salts and lead oxides, zinc borate, antimony oxide, stannous octoate, organic acids, inorganic acids such as sulfuric, hydrochloric, and phosphoric acids, and Lewis acids such as boron trifluoride. The molar ratio of the beta-hydroxy carbamate monomer to the epsilon caprolactone is chosen so that, on average, at least half of the beta-hydroxy groups are reacted with the epsilon-caprolactone, and preferably all of the beta-hydroxy groups are reacted with the epsilon-caprolactone. On average, the beta-hydroxy groups may be reacted up to about 10, preferably up to about 6, more preferably up to about 4, and still more preferably up to about 3 moles of epsilon caprolactone per mole of beta hydroxy groups. The epsilon caprolactone-modified carbamate monomer is then polymerized to produce the acrylic polymer having at least one epsilon-caprolactone moiety in the beta position to a carbamate group.

Whether the acrylic polymer having at least one epsilon-caprolactone moiety in the beta position relative to a carbamate group is formed by the first method described or the second method described, the acrylic polymer preferably is formed by polymerization of other monomers along with the monomer that includes or provides, or is further adducted to provide, the epsilon-caprolactone moiety in the beta position relative to a carbamate group. The β-hydroxy carbamate monomer may be polymerized as a mixture with one or more comonomers. Examples of suitable comonomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The comonomers may be used in any combination. Comonomers having hydroxyl groups, including hydroxyalkyl acrylates and hydroxyalkyl methacrylates, are preferably not included.

The weight percent in the acrylic polymer of the monomer unit having least one epsilon-caprolactone moiety in the beta position relative to a carbamate group is preferably at least about 5% by weight, more preferably at least about 10% by weight, and even more preferably at least about 15% by weight, on average, based on the weight of the acrylic polymer. In addition, the weight percent in the acrylic polymer of the monomer unit having least one epsilon-caprolactone moiety in the beta position relative to a carbamate group is preferably up to about 80% by weight, more preferably up to about 60% by weight, and even more preferably up to about 50% by weight, on average, based on the weight of the acrylic polymer.

The invention further provides a process of preparing an acrylic polymer having an epsilon caprolactone moiety beta to a carbamate group. The process includes a step of reacting the hydroxyl groups of the epsilon caprolactone moieties of the acrylic resin that result from reaction with epsilon caprolactone with a material that converts the hydroxyl groups to a new moiety that does not react with an aminoplast crosslinker during the curing of the coating composition. Avoiding the ether linkages that could be formed by reaction of aminoplast crosslinkers with hydroxyl groups improves the resistance of the cured coating to environmental etch. It is particularly preferred for the acrylic polymer having at least one epsilon-caprolactone moiety in the beta position to a carbamate group to have no residual hydroxyl groups. The hydroxyl groups can be converted before or after polymerization of the epsilon-caprolactone extended monomer. A number of different materials may be reacted with the hydroxyl groups to convert the hydroxyl groups to new groups. Preferably, the material is selected from monofunctional isocyanates, acid anhydrides of difunctional carboxylic acids, acid anhydrides of monofunctional carboxylic acids, monofunctional carboxylic acids, alkyl halides including alkyl chlorides, and combinations of these.

The monofunctional isocyanates may be aromatic, arylaliphatic, or aliphatic. Preferably, the monofunctional isocyanate material includes a monofunctional isocyanate compound selected from aliphatic compounds, including cycloaliphatic compounds. Examples of suitable monofunctional isocyanate compounds include, without limitation, butyl isocyanate, propyl isocyanate, octyl isocyanate, cyclohexyl isocyanate, alkyl isocyanatoacetates such as ethyl isocyanatoacetate, and combinations of these.

When the hydroxyl groups are reacted with an acid anhydride of a dicarboxylic acid, the residual acid group is not expected to react with the aminoplast crosslinker to any significant extent at the curing temperature for the carbamate group reaction with the aminoplast crosslinker. In any event, the reaction would not result in an ether group. Suitable acid anhydride compounds include, without limitation, acetic anhydride, maleic anhydride, malonic anhydride, succinic anhydride, phthalic anhydride, and combinations of these.

Hydroxyl groups of the caprolactone moieties may also be reacted with monofunctional acids in an esterification reaction. Suitable monofunctional acids include, without limitation, acetic acid, butyric acid, octanoic acid, neoacids (many of which are commercially available from Exxon Corporation), and combinations of these. The hydroxyl groups may also be reacted with acid halides, preferably acid chlorides, in a reaction in which the hydroxyl group is esterified. Examples of useful acid halides include, without limitation, acetyl chloride, propionyl chloride, butyryl chloride, and so on.

In another method of converting the hydroxyl groups to new groups that will not form an ether linkage with the aminoplast crosslinker during curing of the coating composition, the hydroxyl groups may be reacted with an alkyl haloformate, particularly an alkyl chloroformate. The reaction forms an ester group with HCl as a by-product. Suitable examples of alkyl haloformates include, without limitation, ethyl chloroformate, propyl chloroformate, and combinations of these.

The invention further provides a coating composition that includes the acrylic polymer having at least one epsilon-caprolactone moiety in the beta position relative to a carbamate group. The coating composition may further include crosslinkers, catalysts, pigments, fillers, solvents and additional components typically used in preparing a coating composition. The use of the polymer having carbamate-functionality with at least one epsilon-caprolactone moiety beta to a carbamate group provides the coating composition with an increased resistance to environmental etch and that has a lower volatile organic content.

Useful curing agents include materials having active methylol or methylalkoxy groups, such as aminoplast crosslinking agents or phenol/formaldehyde adducts; materials having siloxane or silane groups; and materials having or materials with anhydride groups. Suitable examples include, without limitation, aminoplast resins including melamine formaldehyde resins (including monomeric or polymeric melamine resins and partially or fully alkylated melamine resins), urea resins (including methylol ureas such as urea formaldehyde resins, alkoxy ureas such as butylated urea formaldehyde resin), N-methylol acrylamides such as isobutoxy methyl acrylamide, polysuccinic anhydride, and dimethyldimethoxy silane. The carbamate-functional acrylic polymer of the present invention preferably is combined with at least an aminoplast crosslinker in the coating composition. The aminoplast crosslinker has, on average, at least about two functional groups reactive with the acrylic resin. Aminoplast crosslinkers, by which we mean to include phenol/formaldehyde adducts, are characterized as having active methylol or methylalkoxy groups. Examples of preferred curing agent compounds include, without limitation, melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), and resins having polymerized isobutoxymethyl acrylamide groups. The curing agent may be combinations of these. Combinations of tris(alkoxy carbonylamino) triazine with a melamine formaldehyde resin and/or an isocyanate or blocked isocyanate curing agent are likewise suitable and desirable.

In the case of crosslinkers or highly catalyzed systems that do not have long-term stability at room temperatures when mixed, the coating is formulated as a two-component coating composition, also known as two-pack or 2K coating composition, with the crosslinker being segregated in a container separate from the components with which it reacts.

A solvent may optionally be included in the coating composition. Although the coating composition may be utilized, for example, in the form of substantially solid powder or a dispersion, it is often desirable that the composition is in a substantially liquid state, which can be accomplished with the use of a solvent. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

The coating composition used in the practice of the invention may include a catalyst to enhance the cure reaction. For example, aminoplast compounds, especially monomeric melamines, may use a strong acid catalyst to enhance the cure reaction. Such catalysts are well-known in the art and include, without limitation, p-toluenesulfonic acid, dinonylnaphthalene disulfonic acid, dodecylbenzenesulfonic acid, triflic acid, phenyl acid phosphate, monobutyl maleate, butyl phosphate, and hydroxy phosphate ester. Strong acid catalysts are often blocked, e.g. with an amine, when used in OEM coating compositions, but unblocked catalysts are preferred for refinish coating compositions. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. The coating may also be used as a pigmented coating. The coating may contain any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

Coating compositions can be coated on the article by any of a number of techniques well-known in the art. These include, for example, spray coating, dip coating, roll coating, curtain coating, and the like. For automotive body panels, spray coating is preferred. The coating composition can be applied to a substrates of different materials, especially metal substrates and plastic substrates (both rigid plastics and flexible substrates). Preferably, the substrate is an automotive vehicle body or part. In one aspect of the invention, the coating composition is applied as a refinish coating on an automotive vehicle. After being coated on the substrate, the coating composition is cured by reaction between the crosslinker and the acrylic polymer.

The invention is further described in the following examples. The examples are merely illustrative and do not in any way limit the scope of the invention as described and claimed. All parts are parts by weight unless otherwise noted.

EXAMPLE

A reactor is charged with a mixture of 1463 grams of a beta hydroxy carbamate-functional acrylic polymer (70% by weight nonvolatiles in ketone solvents, hydroxyl equivalent weight of 1024 grams per equivalent) and 228 grams of $\epsilon$-caprolactone and 7.5 grams of acetic acid. The mixture is heated to 125° C. and held at that temperature for about 4 hours. The product polymer having an epsilon-caprolactone moiety beta to a carbamate group was cooled.

A coating composition is prepared from the carbamate-functional acrylic polymer having an epsilon-caprolactone moiety beta to a carbamate group by combining 1200 grams of the polymer with 380 grams of hexamethoxymethyl melamine and 50.2 grams of a blocked p-toluene sulfonic acid catalyst (25% by weight active).

A primed steel panel is coated to hiding with a commercially available black basecoat coating. The applied basecoat is allowed to flash for five minutes. The prepared clearcoat coating composition containing the carbamate-functional acrylic resin having the epsilon-caprolactone moiety is then applied over the uncured basecoat at a dry film thickness of approximately 2 mils and allowed to flash. The applied basecoat and clearcoat coating layers are then cured at the same time by baking the coated steel panel in a forced-air oven at 250° F. for thirty minutes.

The invention has been described in detail with reference to preferred embodiments thereof. It should be understood, however, that variations and modifications can be made within the spirit and scope of the invention.

What is claimed is:

1. A carbamate-functional acrylic polymer comprising an epsilon-caprolactone moiety beta to a carbamate group.

2. A coating composition comprising a carbamate-functional acrylic polymer having a monomer unit with an epsilon-caprolactone moiety beta to a carbamate group.

3. A coating composition according to claim 2, further comprising a crosslinker, wherein the monomer unit includes a structure:

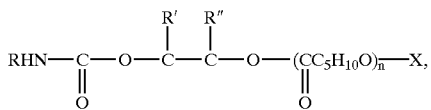

wherein R is hydrogen or alkyl, n is, on average, from about 0.5 up to about 10, X is hydroxyl or a functional group that is unreactive with the crosslinker, one of R' and R" is H or alkyl of up to 4 carbon atoms, and the other of R' and R" is a divalent radical connecting to the remainder of the monomeric unit.

4. A coating composition according to claim 3, wherein R is hydrogen or an alkyl of from 1 to 4 carbons.

5. A coating composition according to claim 3, wherein n is, on average, from about 0.5 to about 6.

6. A coating composition according to claim 3, wherein n is, on average, from about 0.5 to about 6.

7. A coating composition according to claim 3, wherein n is, on average, from about 1 to about 4.

8. A coating composition according to claim 3, wherein n is, on average, from about 1 to about 3.

9. A coating composition according to claim 3, wherein X does not have functionality that reacts with the crosslinker.

10. A coating composition according to claim 2, wherein the acrylic polymer is free of hydroxyl functionality.

11. A coating composition according to claim 2, wherein the acrylic polymer has primary carbamate groups.

12. A coating composition according to claim 2, wherein the coating composition comprises from about 5% to about 80% by weight of the acrylic polymer.

13. A coating composition according to claim 2, wherein the coating composition comprises from about 10% to about 60% by weight of the acrylic polymer.

14. A coating composition according to claim 2, wherein the coating composition comprises from about 15% to about 50% by weight of the acrylic polymer.

15. A coating composition according to claim 2, further comprising an aminoplast resin.

* * * * *